Patented Mar. 24, 1936

2,035,062

UNITED STATES PATENT OFFICE 2,035,062

COLOR STABILIZATION OF RUBBER SURFACES

William C. Geer, Ithaca, N. Y.

No Drawing. Application May 31, 1932,
Serial No. 614,612

30 Claims. (Cl. 91—68)

This invention relates to a composition of matter, of which rubber or rubber-like substances such as gutta percha, balata or synthetic rubber, are the fundamental or chief ingredients, and more particularly to an improvement in the preparation of such substances to prevent or retard a darkening in color or change in color of the composition after treatment with a halide of an amphoteric element, in accordance with the method described in my copending applications Serial Nos. 208,659 and 542,192, filed respectively July 26, 1927 and June 4, 1931.

An object of the present invention is to provide a composition of matter which will retain its color after being subjected to the treatment referred to above and to produce an article which is resistant to darkening or change in color after such treatment.

Another object of the present invention is to prevent or retard the reactions with the surface of the rubber mixture, treated as above described, which cause the surface to craze and change to a more brittle and less useful surface when the article is exposed to light and air.

In the applications previously mentioned, it is pointed out that a rubber mixture of any desired composition, either before or after vulcanizing, but after forming into the shape of an article of use (namely, a golf ball, a tire, a sole, a heel, etc.) may be treated with a solution of a halide of an amphoteric element, such as tin tetrachloride, antimony penta or trichloride, aluminum chloride, etc., for a suitable length of time to form a hard addition product of the outer surface of such rubber composition, and therefore, integral therewith, and the surface and/or article may subsequently be washed with a solvent which will react with the addition product of the amphoteric halide and will cause it to split off from the rubber, etc., leaving a thin outer film in the form of a hard, polishable polymer of rubber, balata or gutta percha, as the case may be.

The previous invention has been particularly useful in forming a polishable surface upon articles, such as golf balls, heels and the like. It has been observed, however, that when the article is light in color, namely, white, light gray, pink, red, or other light color, it darkens slightly on standing, even in the dark after a period of months, and changes color sometimes to a gray, pink or yellow.

This change of color is perhaps due to the action of the oxygen of the air, and since exposure to the action of ultra violet light or to sunlight causes the color of this polymerized surface to change to a much darker shade in a shorter time than when merely allowed to stand without exposure to such light, the ultra violet light apparently hastens the action. The change in color, therefore, appears to be due to oxidation and the formation of oxides or ozonides of rubber, gutta percha, balata, etc., and may be due either to simple oxidation or to the reaction of a slight residual amount of some salt of the amphoteric element used in the initial treatment. It may also be due to a change in color of the resins normally present in rubber, gutta percha or balata.

I have now discovered that when a rubber, gutta percha or balata mixture contains a normally small quantity of certain substances, which may be mixed with the rubber, etc., on the mixing mill prior to the formation of the article in a mold, that these substances retard or prevent such surface discoloration of the article after treatment.

In describing the invention particular reference will be made to its use in connection with the treatment of the surface of a golf ball having a cover composed largely of balata, although it may be used to advantage in connection with other articles, such as overshoes, tires, heels, soles of shoes, bathing caps, water bottles, etc., which have surfaces of or containing rubber, gutta percha, balata or similar materials, and which surfaces may be polished and will retain their original color.

Examples of substances which may be incorporated in such a rubber mixture for the purposes mentioned are as follows:

1. Mildly alkaline neutralizing agents such as the oxides and hydroxides of the alkaline earth elements.

2. Basic salts containing as part of their chemical composition such oxides and hydroxides of the alkaline earth elements, such as magnesium oxychloride.

The alkaline earth metals referred to above are magnesium, calcium, strontium and barium. I prefer to use magnesium oxide (MgO) or calcium oxide (Ca(OH)$_2$) for the purpose indicated.

3. The hydroxides of the alkali metals, namely, of lithium, sodium, potassium, rubidium and caesium may also be used for this purpose, although because these hydroxides are strongly caustic and absorb water from the air, they are not of such practical importance as the groups referred to above.

4. Organic salts of the alkali and alkaline earth metals may also be used for this purpose. The fatty acid salts of the alkali metals are sufficiently alkaline to preserve the color of these surfaces; for example, sodium stearate, sodium oleate and sodium palmitate may be used. Fatty acid salts of calcium and magnesium, for example, magnesium stearate, illustrate fatty acid salts of the alkaline earth metals which may be used in this connection. Other organic salts such as calcium tartrate are effective.

It has also been found that other organic materials may be used alone or with the above mentioned compounds to retard the discoloration of the surfaces treated by the halide of the amphoteric element. For example, proteins which may be dispersed uniformly into rubber mixture have been found to be useful in this connection. Glue, gelatin and albumens are examples of such substances. These may also have the effect of toughening the coating.

Decomposition products of the proteins, such as urea and the derivatives of these decomposition products are also effective in retarding this color change and a considerable number of amido compounds or amines or amides, such as the anilides, of which acetanilide is a characteristic example, may be used for this purpose. The zinc salt of dithio carbamic acid may also be used in this connection.

The amido substances which are effective in this connection, broadly speaking, are the ones which do not react directly with amphoteric halides to form a colored addition product or a colored decomposition product, and which are reducing agents in the sense that they combine with relative ease with oxygen.

As a specific example of a composition utilizing my invention and suitable for use as the cover of a golf ball, the following ingredients may be mixed in the proportions by weight as indicated:

|  | Parts |
|---|---|
| Resin free gutta percha or balata | 100 |
| Pale crepe rubber | 20 |
| Titanium dioxide | 20 |
| Magnesium oxide | 3 |

Another suitable composition may be produced by substituting 17½ parts of a good grade of light colored glue for the magnesium oxide in the above composition.

Another specific example is as follows:

|  | Parts |
|---|---|
| Resin free gutta percha or balata | 100 |
| Pale crepe rubber | 22 |
| Titanium oxide | 20 |
| Urea | 1 |

Improved results may also be obtained by combining the organic material with the inorganic oxide, hydroxide or salt. An example of such a composition is as follows:

|  | Parts |
|---|---|
| Resin free gutta percha or balata | 100 |
| Pale crepe rubber | 17½ |
| Glue | 17½ |
| Titanium dioxide | 20 |
| Magnesium oxide | 3 |
| Urea | 1 |

If it is desired to vulcanize the composition, sulphur in quantities sufficient to give the desired characteristics may be added to any of the above compositions. An example of such a composition is as follows:

|  | Parts |
|---|---|
| Resin free gutta percha or balata | 100 |
| Pale crepe rubber | 25 |
| Glue | 25 |
| Titanium dioxide | 40 |
| Zinc oxide | 5 |
| Magnesium oxide | 3 |
| Sulphur | 3 |
| Urea | 1 |
| Accelerator | 1 |

The substances mentioned in each of the above examples are to be mixed together according to the well known practices of the rubber industry. The compositions to which sulphur is added may be vulcanized at a suitable temperature and time to give the desired characteristics to the rubber, which may be determined upon trial by anyone skilled in the art. It is not intended in any sense to limit the invention to the compositions named either as to the substances used in the mixture or the proportions of any one or several of the color retarding or other substances. In some instances it may be advisable to either increase or decrease the quantity of glue, magnesium oxide, urea, or any specified substance or substances which may act to stabilize the color in the way which these do singly or when mixed together.

Of the color stabilizers given in the above examples, I prefer to use the oxides of the alkaline earth group, for example, magnesium oxide in the proportions of 2 to 10 parts by weight per 100 parts of gutta percha, rubber, balata, or their equivalents, in the rubber compound.

In preparing an article, such, for example, as a golf ball, the cover may be prepared from one of the compositions given above or some other suitable composition containing the color stabilizer. It may then be molded in accordance with well known practice into the shape of the golf ball with proper markings. The formed golf ball may then be treated with an organic solution of a halide of an amphoteric element, for example, tin tetrachloride in ethylene dichloride, or in ethylene dichloride and a solvent which reacts with the halide, such as ethyl acetate, and may then be washed one or more times with a solvent which reacts with the addition product of the halide of the amphoteric element and the rubber, balata or gutta percha, such as acetone or methyl or ethyl alcohol. The above procedure is described in detail in the copending applications previously mentioned. The golf ball or other article may then be allowed to dry and may be polished, leaving a hard resistant integral finish with a low coefficient of friction. The article upon standing, even for long periods of time, will retain its original color; in the case of a golf ball using one of the compositions described above, this color will be white. There is no noticeable darkening or other discoloration upon standing, whereas a similar composition omitting the color stabilizer and formed into the cover of a golf ball and treated as described above, will change to a light gray, pink or yellow color upon standing for only a few months. The golf balls treated as mentioned above and of a composition containing one or more of the color retarding substances resist the coloring action of the sunlight or of the ultra violet light to a remarkable degree.

Other white pigments may, of course, be used in place of the titanium dioxide and the zinc oxide, for example, lithopone, titanox, barium sulphate and zinc sulphide, and where other colors are desired, suitable pigments may be substituted for or added to the ones given in order to give the desired color or shade of color.

Instead of forming the article or the cover of the article with a composition such as one of those described above, a coating of a rubber, balata, or gutta percha compound containing a coloring material and a color stabilizer may be applied to the article, or the cover, and the surface of the coating may be subsequently treated as described to produce a hard polishable surface.

It must be understood that although certain probable reasons for the activity of these alkali and alkaline earth oxides, hydroxides and basic salts, proteins and amido bodies have been given, it is not intended that these reasons or theories should limit the invention or the value of the invention. The principles involved are those in the use of a rubber composition of substances which will retard or prevent a discoloration upon standing of a rubber mixture which has been given a treatment with an amphoteric halide and a subsequent washing treatment. Various modifications within the spirit of this specification will readily suggest themselves to those skilled in the art.

The terms used in defining this invention have been used as terms of description and not as terms of limitation and it is intended that all equivalents thereof be included within the scope of the appended claims.

The term "rubber" as used in the appended claims is not used in its technical sense, but is intended to include natural or synthetic rubber, crude or deresinized balata, crude or deresinized gutta percha and materials of similar characteristics, used in a compound together with other compounding ingredients, or as many together as may be desired and in any chosen proportions.

What I claim is:

1. In the preparation of an article having a rubber surface, the step comprising incorporating into the rubber a color stabilizer and subsequently subjecting the surface of the article to the action of a halide of an amphoteric element, said color stabilizer being a compound capable of reacting with compounds of the amphoteric element remaining on the surface so treated.

2. In the preparation of an article having a rubber surface, the step comprising incorporating into the rubber a white pigment and a color stabilizer, and subsequently subjecting the surface of the article to the action of a halide of an amphoteric element and thereafter treating the surface with a substance which reacts with the reaction product of the rubber and the halide, said color stabilizer being a compound capable of reacting with compounds of the amphoteric element remaining on the surface so treated.

3. In the preparation of an article having a rubber surface, the steps comprising incorporating into the rubber a pigment of the class consisting of titanium dioxide, zinc oxide, zinc sulphide, lithopone, barium sulphate and titanox, and a color stabilizer of the class consisting of oxides and hydroxides of alkaline earth metals and treating the surface of the article with an anhydrous halide of an amphoteric element, and thereafter with a solvent which will cause the halide to split off from the rubber.

4. In the preparation of a golf ball, the steps comprising incorporating into the rubber material of the cover a white pigment, a color stabilizer consisting of a compound of the class comprising the oxides and hydroxides of the alkaline earth metals, and subjecting the cover of the ball to the action of tin tetrachloride and washing the surface with a solvent that reacts with the reaction product of rubber and the said chloride.

5. A golf ball comprising a cover containing rubber, a white pigment and a color stabilizer composed of a compound of the class consisting of the proteins, which stabilizer will retard or prevent surface discoloration after the surface of said golf ball has been subjected to the action of a halide of an amphoteric element and thereafter washed with a solvent which will cause the said halide to split off from the rubber.

6. A golf ball comprising a cover containing rubber, a white pigment, and a color stabilizer comprising a compound of the class consisting of the oxides and hydroxides of the alkaline earth metals, said golf ball having been subjected to the action of a halide of an amphoteric element and thereafter washed with a solvent which will react with the resulting addition product.

7. A golf ball comprising a cover containing rubber, a white pigment and a color stabilizer comprising one or more compounds of the class consisting of the oxides and hydroxides of the alkaline earth metals and having a hard, integral surface comprising a polymer of the rubber compound resulting from a treatment with the halide of an amphoteric element.

8. An article of manufacture, comprising an outer portion composed essentially of rubber, a pigment and a color stabilizer, the surface of said article having an integral film comprising a polymer of the rubber compound resulting from a treatment with the halide of an amphoteric element, said color stabilizer being a compound capable of reacting with compounds of the amphoteric element remaining on the surface so treated.

9. An article of manufacture the outer portion of which is composed essentially of rubber, a color stabilizer comprising a substance of the class comprising the proteins, and a pigment of the class consisting of titanium dioxide, zinc oxide, zinc sulphide, barium sulphate, lithopone and titanox, the surface of which portion has been subjected to the action of a halide of an amphoteric element and to a solvent which will react with the resulting addition product.

10. A method for preparing a rubber surface comprising incorporating into the rubber a color stabilizer comprising one or more compounds of the class consisting of the oxides and hydroxides of the alkaline earth metals, and subsequently subjecting the said surface to the action of a halide of an amphoteric element, and thereafter washing the surface with a solvent for the said halide.

11. In the preparation of an article having a rubber surface, the steps comprising incorporating into the rubber a color stabilizer comprising a compound of the class consisting of the fatty acid salts of the alkali and alkaline earth metals, and subsequently treating the surface of the article with a halide of an amphoteric element, and washing the surface with a solvent which will react with the addition product of the rubber and the halide.

12. A method as defined in claim 1 in which tin tetrachloride is the amphoteric halide.

13. In the preparation of an article having a rubber surface, the steps comprising incorporating into the rubber a color stabilizer comprising a compound of the class consisting of the proteins, and subsequently treating the surface of the article with a halide of an amphoteric element, and then washing the surface with a solvent which will react with the addition product of the rubber and the amphoteric halide.

14. An article of manufacture, the outer portion of which is composed essentially of rubber and a color stabilizer comprising one or more compounds of the class consisting of the oxides and hydroxides of the alkaline earth metals, the surface of said article having been subjected to the action of a halide of an amphoteric element, and thereafter washed with a solvent which will cause the said halide to split off from the rubber.

15. In the preparation of an article having a rubber surface, the steps comprising incorporating into the rubber a pigment of the class consisting of titanium dioxide, zinc oxide, zinc sulphide, lithopone, barium sulphate and titanox, and a color stabilizer of the class consisting of the proteins and treating the surface of the article with an anhydrous halide of an amphoteric element, and thereafter with a solvent which will cause the halide to split off from the rubber.

16. In the preparation of an article having a rubber surface, the steps comprising incorporating into the rubber a pigment of the class consisting of titanium dioxide, zinc oxide, zinc sulphide, lithopone, barium sulphate and titanox, and a color stabilizer of the class consisting of the fattty acid salts of the alkali and the alkaline earth metals and treating the surface of the article with an anhydrous halide of an amphoteric element, and thereafter with a solvent which will cause the halide to split off from the rubber.

17. In the preparation of a golf ball, the steps comprising incorporating into the rubber material of the cover a white pigment, a color stabilizer consisting of a compound of the class comprising the proteins, and subjecting the cover of the ball to the action of tin tetrachloride and washing the surface with a solvent that reacts with the reaction product of rubber and the said chloride.

18. In the preparation of a golf ball, the steps comprising incorporating into the rubber material of the cover a white pigment, a color stabilizer consisting of a compound of the class comprising the fatty acid salts of the alkali and the alkaline earth metals, and subjecting the cover of the ball to the action of tin tetrachloride and washing the surface with a solvent that reacts with the reaction product of rubber and the said chloride.

19. A golf ball comprising a cover containing rubber, a white pigment and a color stabilizer composed of a compound of the class consisting of the oxides and hydroxides of the alkaline earth metals, which stabilizer will retard or prevent surface discoloration after the surface of said golf ball has been subjected to the action of a halide of an amphoteric element and thereafter washed with a solvent which will cause the said halide to split off from the rubber.

20. A golf ball comprising a cover containing rubber, a white pigment and a color stabilizer composed of a compound of the class consisting of the fatty acid salts of the alkali and alkaline earth metals, which stabilizer will retard or prevent surface discoloration after the surface of said golf ball has been subjected to the action of a halide of an amphoteric element and thereafter washed with a solvent which will cause the said halide to split off from the rubber.

21. A golf ball comprising a cover containing rubber, a white pigment, and a color stabililzer comprising a compound of the class consisting of the proteins, said golf ball having been subjected to the action of a halide of an amphoteric element and thereafter washed with a solvent which will react with the resulting addition product.

22. A golf ball comprising a cover containing rubber, a white pigment, and a color stabilizer comprising a compound of the class consisting of the fatty acid salts of the alkali and alkaline earth metals, said golf ball having been subjected to the action of a halide of an amphoteric element and thereafter washed with a solvent which will react with the resulting addition product.

23. A golf ball comprising a cover containing rubber, a white pigment and a color stabilizer comprising one or more compounds of the class consisting of the proteins and having a hard, integral surface comprising a polymer of the rubber compound resulting from a treatment with the halide of an amphoteric element and with a solvent which will react with the resulting addition product.

24. A golf ball comprising a cover containing rubber, a white pigment and a color stabilizer comprising one or more compounds of the class consisting of the fatty acid salts of the alkali and alkaline earth metals and having a hard, integral surface comprising a polymer of the rubber compound resulting from a treatment with the halide of an amphoteric element and with a solvent which will react with the resulting addition product.

25. An article of manufacture the outer portion of which is composed essentially of rubber, a color stabilizer comprising a substance of the class comprising the oxides and hydroxides of the alkaline earth metals, and a pigment of the class consisting of titanium dioxide, zinc oxide, zinc sulphide, barium sulphate, lithopone, and titanox, the surface of which portion has been subjected to the action of a halide of an amphoteric element and to a solvent which will react with the resulting addition product.

26. An article of manufacture the outer portion of which is composed essentially of rubber, a color stabilizer comprising a substance of the class comprising the fatty acid salts of the alkali and alkaline earth metals, and a pigment of the class consisting of titanium dioxide, zinc oxide, zinc sulphide, barium sulphate, lithopone and titanox, the surface of which portion has been subjected to the action of a halide of an amphoteric element and to a solvent which will react with the resulting addition product.

27. An article of manufacture, the outer portion of which is composed essentially of rubber and a color stabilizer comprising one or more compounds of the class consisting of the fatty acid salts of the alkali or the alkaline earth metals, the surface of said article having been subjected to the action of a halide of an amphoteric element, and thereafter washed with a solvent which will cause the said halide to split off from the rubber.

28. An article of manufacture, the outer portion of which is composed essentially of rubber and a color stabilizer comprising one or more compounds of the class consisting of the proteins, the surface of said article having been subjected to the action of a halide of an amphoteric element, and thereafter washed with a solvent which will cause the said halide to split off from the rubber.

29. In the preparation of an article having a surface composed of a rubber mixture the step comprising incorporating into the said rubber mixture a substance which will retard or prevent surface discoloration of the said rubber surface after that surface has been treated with a halide of an amphoteric element, and washed with a substance which will react with the addition product of the rubber and the said halide.

30. In the preparation of an article having a rubber surface the step comprising mixing into the rubber a white pigment and a substance which will retard or prevent surface discoloration of the article after the said article has been subjected to the action of tin tetrachloride and thereafter washed with a substance which reacts with the addition product of the rubber and the said chloride.

WILLIAM C. GEER.